(12) United States Patent
Sharma et al.

(10) Patent No.: US 11,552,878 B1
(45) Date of Patent: Jan. 10, 2023

(54) MANAGING REPLAY WINDOWS IN MULTIPATH CONNECTIONS BETWEEN GATEWAYS

(71) Applicant: VMWARE, INC., Palo Alto, CA (US)

(72) Inventors: Awan Kumar Sharma, Pune (IN); Yong Wang, Palo Alto, CA (US); Sourabh Bhattacharya, Pune (IN); Deepika Kunal Solanki, Pune (IN); Sarthak Ray, Pune (IN); Jochen Behrens, Santa Cruz, CA (US)

(73) Assignee: VMware, Inc., Palto Alto, CA (US)

( * ) Notice: Subject to any disclaimer, the term of this patent is extended or adjusted under 35 U.S.C. 154(b) by 0 days.

(21) Appl. No.: 17/492,723

(22) Filed: Oct. 4, 2021

(30) Foreign Application Priority Data

Jul. 15, 2021 (IN) .............................. 202141031947

(51) Int. Cl.
*G06F 15/173* (2006.01)
*H04L 45/24* (2022.01)
*H04L 9/40* (2022.01)
*H04L 45/00* (2022.01)
*H04L 45/42* (2022.01)

(52) U.S. Cl.
CPC .............. *H04L 45/24* (2013.01); *H04L 45/42* (2013.01); *H04L 45/566* (2013.01); *H04L 63/20* (2013.01)

(58) Field of Classification Search
CPC ....... H04L 45/24; H04L 45/42; H04L 45/566; H04L 63/20
USPC ......................................................... 709/238
See application file for complete search history.

(56) References Cited

U.S. PATENT DOCUMENTS

| | | | |
|---|---|---|---|
| 2002/0133534 A1* | 9/2002 | Forslow | H04L 12/4641 709/200 |
| 2003/0126233 A1* | 7/2003 | Bryers | H04L 9/40 709/219 |
| 2005/0005024 A1* | 1/2005 | Samuels | H04L 67/56 709/238 |
| 2005/0060426 A1* | 3/2005 | Samuels | H04L 67/56 709/238 |
| 2007/0110024 A1* | 5/2007 | Meier | H04L 45/46 370/351 |
| 2009/0310485 A1* | 12/2009 | Averi | H04L 45/26 370/232 |
| 2011/0004708 A1* | 1/2011 | Kondo | G06F 3/0614 710/38 |
| 2014/0244687 A1* | 8/2014 | Shmueli | G06F 16/28 707/780 |
| 2017/0359258 A1* | 12/2017 | Flanagan | H04L 45/52 |
| 2019/0173789 A1* | 6/2019 | Shalev | H04L 45/745 |
| 2021/0127269 A1* | 4/2021 | Gupta | H04L 63/061 |
| 2021/0297351 A1* | 9/2021 | Vegesna | H04L 47/12 |

* cited by examiner

*Primary Examiner* — Liang Che A Wang

(57) ABSTRACT

Described herein are systems, methods, and software to manage replay windows in multipath connections between gateways. In one implementation, a first gateway may receive a packet directed toward a second gateway and identify a path from a plurality of paths to the second gateway. Once identified, the first gateway may increment a sequence number associated with the path and encapsulate the packet with a unique identifier for the path in the header with the incremented sequence number. The first gateway the communicates the encapsulated packet to the second gateway.

20 Claims, 5 Drawing Sheets

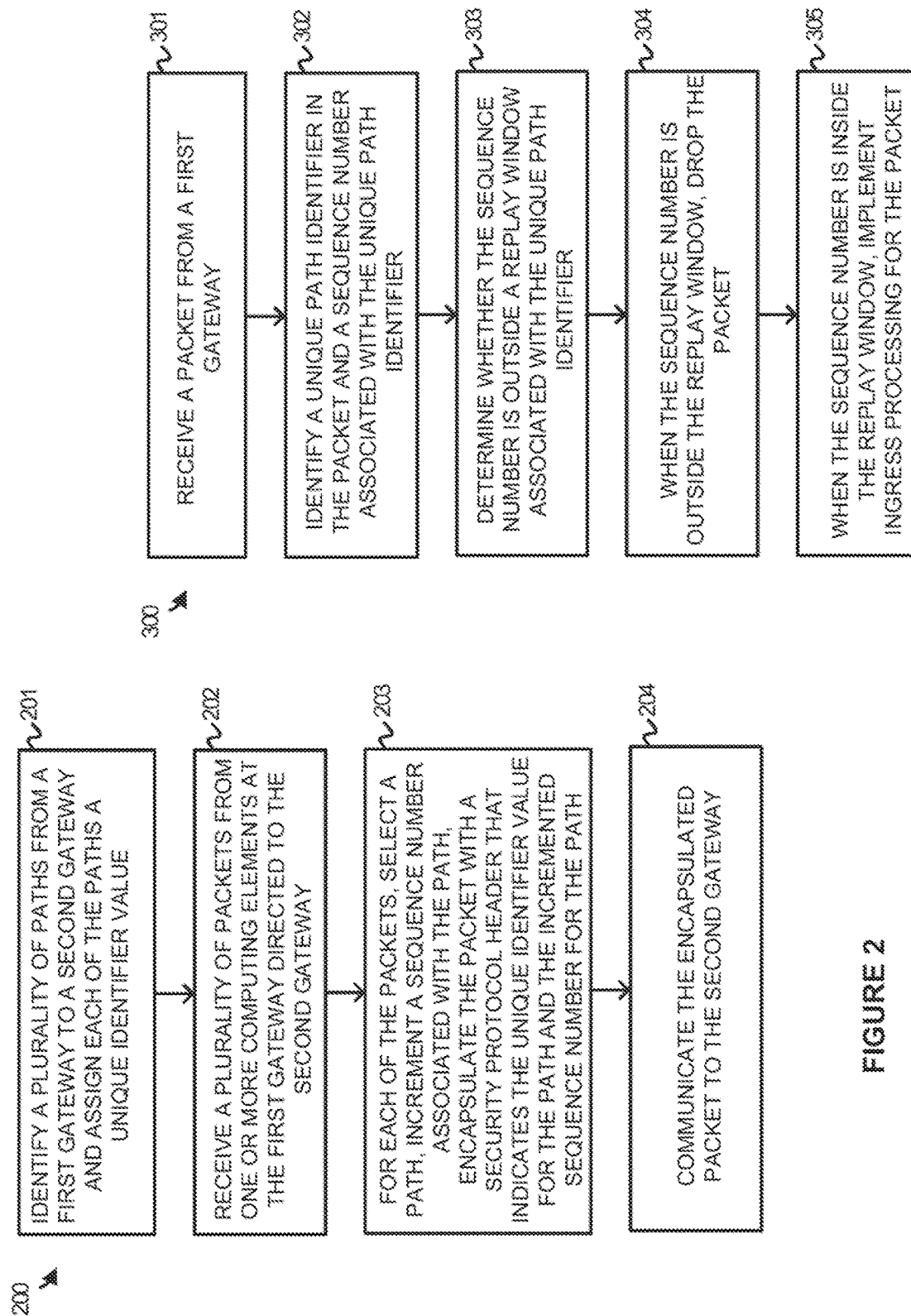

| PATH ID 410 | MIN SEQUENCE VALUE 412 | MAX SEQUENCE VALUE 414 |
|---|---|---|
| PATH 411 | 101 | 200 |
| PATH 412 | 661 | 760 |
| PATH 413 | 601 | 700 |
| PATH 414 | NULL | NULL |

Columns 412 and 414 are bracketed as WINDOW 420.

FIGURE 4

MANAGING REPLAY WINDOWS IN MULTIPATH CONNECTIONS BETWEEN GATEWAYS

RELATED APPLICATIONS

Benefit is claimed under 35 U.S.C. 119(a)-(d) to Foreign Application Serial No. 202141031947 filed in India entitled "MANAGING REPLAY WINDOWS IN MULTIPATH CONNECTIONS BETWEEN GATEWAYS", on Jul. 15, 2021, by VMware, Inc., which is herein incorporated in its entirety by reference for all purposes.

BACKGROUND

In computing networks, gateways are used to provide connectivity between different computing sites or datacenters. These gateways may be used to implement network address translation, encapsulation, encryption, firewalls, and a secure virtual private network (VPN) tunnel based on a security protocol such as Internet Protocol Security (IPsec). The computers at each of the computing sites may include physical computing systems, such as desktop computing systems, servers, and the like, and may further include virtual computing systems, such as virtual machines, containers, and the like.

In some implementations, a connection between two gateways may be possible using multiple paths, wherein each of the paths can use a different combination of one or more forwarding devices such as routers to provide the connection. These different paths may provide varying latency, bandwidth, packet drop rates, and other connection characteristics between the gateways. However, while one may improve a connection's characteristics by selecting and using different paths between gateways, difficulties can arise in managing secure connections between the gateways. For example, sequence numbers that prevent replay attacks and other attacks on the connection can be disrupted when multiple paths are used between the gateways.

Overview

The technology disclosed herein manages replay windows associated with multipath connections between gateways. In one implementation, a method of operating a first gateway includes receiving a packet having a security protocol header from a second gateway and identifying a unique path identifier a sequence number associated with the unique path identifier in the security protocol header. The method further provides determining whether a value of the sequence number is within a replay window and a window update buffer associated with the unique path identifier. Based at least in part on whether the value of the sequence number is within the replay window and the window update buffer associated with the unique path identifier, dropping the packet, or subjecting the packet to further ingress processing operations. In some implementations, the security protocol header may comprise an IPsec protocol header.

BRIEF DESCRIPTION OF THE DRAWINGS

FIG. 2 illustrates an operation of a gateway to transmit a packet across a secure multipath connection according to an implementation.

FIG. 3 illustrates an operation of a gateway to receive a packet via a secure multipath connection according to an implementation.

FIG. 4 illustrates a data structure to manage window size associated with different paths according to an implementation.

DETAILED DESCRIPTION

Figure 1:
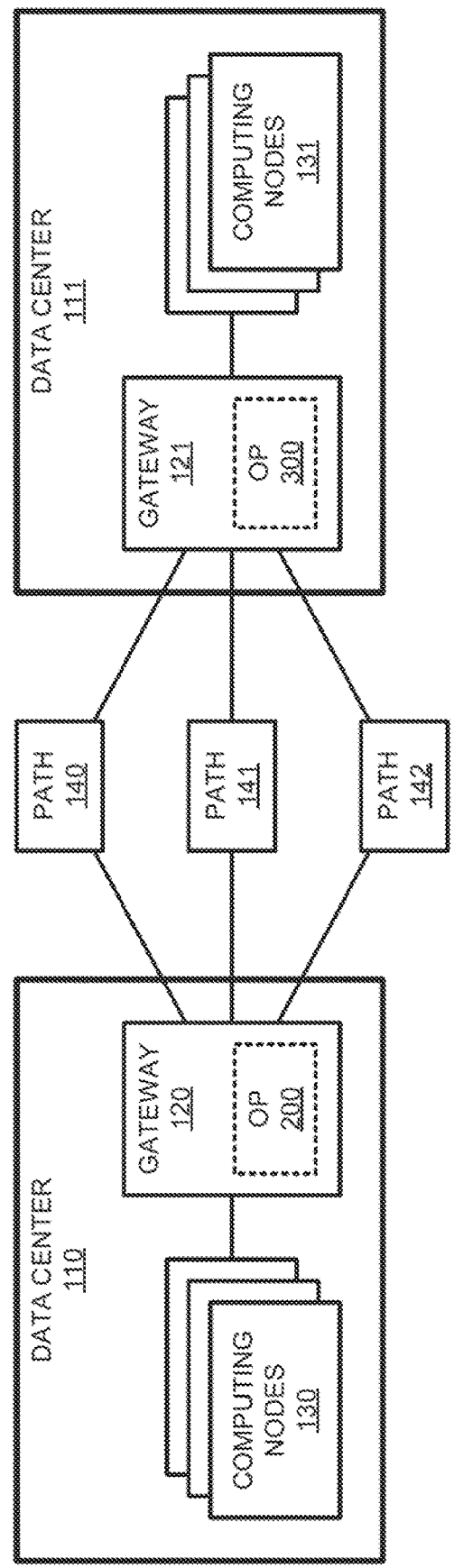
FIG. 1 illustrates a computing environment to manage replay windows associated with multipath connections between gateways according to an implementation.

FIG. 1 illustrates a computing environment 100 in which replay windows associated with multipath connections between gateways may be managed. Computing environment 100 includes data centers 110-111, wherein data centers 110-111 include computing nodes 130-131 and gateways 120-121, respectively. Gateways 120-121 communicate using paths 140-142 that may each include one or more routers or gateways to couple data centers 110-111. Gateway 120 provides operation ("OP") 200 that is further described below in FIG. 2, while gateway 121 provides operation ("OP") 300 that is described below in FIG. 3.

In data centers 110-111, computing nodes 130-131 are deployed to provide various applications for one or more organizations. Computing nodes 130-131 may comprise virtual computers, such as virtual machines, containers, and the like, or may comprise physical computing systems, such as servers, desktop computers, or some other physical computer. Computing nodes 130-131 may provide end user desktops, web applications, data processing applications, or some other application or service.

Here, to provide connectivity between computing nodes 130 in data center 110 and computing nodes 131 in data center 111, gateways 120-121 are employed. Gateways 120-121 may provide routing for computing nodes 130-131, firewall operations, and security operations including encryption/decryption and encapsulation operations. While only one gateway is shown in each data center, multiple gateways may be present for redundancy and/or increased bandwidth. In communicating between gateways 120-121, multiple paths 140-142 are employed that may each comprise one or more routers or other packet forwarding or processing nodes (not shown) to couple the gateways. For paths 140-142, gateways 120-121 may a virtual private network (VPN) tunnel to securely communicate data associated with computing nodes 130-131 across multiple different paths. To prevent replay attacks, wherein an attacker detects a data transmission, and attempts to gain unauthorized access to a network by replaying the data transmission, gateways 120-121 may maintain multiple replay windows that are each associated with a different path. For example, gateway 121 may maintain a replay window for each path of paths 140-142.

In the case of VPN connections implementing Internet Protocol Security (IPsec), the IPsec security header includes a 32-bit sequence number field. In this case, gateway 120 may use a set of bits in the sequence number field in the IPsec header to indicate a selected path for the packet (i.e., a unique identifier for the path) and remaining bits for the sequence number associated with the path.

Once communicated to gateway 121, gateway 121 may determine whether the value of the sequence number associated with the unique identifier for the path is within the replay window for the path and a window update buffer associated with the path. The replay window comprises a current highest received sequence number for the path minus a replay window size, while the window update buffer comprises permitted sequence numbers that are higher than the current highest received sequence number. The window update buffer may permit any sequence number higher than the current highest received sequence value or may permit a limited range of sequence numbers higher than the highest received sequence number. If the value of the sequence number is below (i.e., less than) the replay window, then the packet is dropped. However, if the sequence number's value is within the replay window and the window update buffer, then the packet may be processed, wherein the process may include decrypting the packet and authenticating the packet using hashing or other information in the header of the IPsec packet. Once decrypted, the packet may be forwarded to a destination computing node. In some implementations, if the sequence number is above the window update buffer and the replay window, the packet may also be dropped.

In some implementations, gateways 120-121 may maintain one or more data structures that correspond to replay windows associated with the different paths between the gateways. The replay windows correspond to the largest sequence number received in the IPsec communication minus a set value for the window. For example, a highest sequence number received over path 140 may indicate a value of 500 and the window size may be set to 100. As a result, any packet that is received that has a sequence number less than 401 may be dropped. Any packet having a sequence number between 401-500, inclusively, may be processed (i.e., decrypted and authenticated) and any packet having a sequence number greater than 500 may be processed and can be used to update the replay window or shift the window to higher values.

In some implementations, when a packet is communicated from gateway 120, gateway 120 may be responsible for selecting an available path for the communication. For example, each path of paths 140-142, the paths may correspond to a different next-hop router (not shown) and gateway 120 may be required to select a next-hop router for the communication. When a packet is received from a computing node 130, gateway 120 may select a path based on flow or tuple information in the packet, wherein the flow information may include IP addressing, port information, protocol, and the like. Once selected, the packet can be encapsulated with a security header having the unique path identifier and sequence number and forwarded to gateway 121 using the selected path. In at least one example, the path can be selected by hashing the flow information from the packet, wherein, for example, the resulting hash value, or a modulo thereof, corresponds to a path identifier. Consequently, once the path is selected for the flow information, any subsequent packet that shares the flow information may be communicated using the same path. The path used for the flow information may be selected by the hash, may be selected based on network or connection status information (latency, throughput, and the like), or may be selected in some other manner. In some implementations, flow information may be associated with a path identifier previously stored in a data structure that associates the flow identifier (e.g., tuple information) with the path identifier, such that future packets that share the same flow information will be forwarded to the destination gateway using the same path.

FIG. 2 illustrates a flowchart of operation 200 illustrating an exemplary method that may be performed by gateway 120 to communicate a packet using a secure protocol (e.g., IPsec) via one of a plurality of paths of a multipath connection according to an implementation. The reference numbers identifying steps in the flowchart are referenced parenthetically in the paragraphs that follow with further reference to systems and elements of computing environment 100 in FIG. 1. Although demonstrated using gateway 120, gateway 121 may perform similar operations in communicating a packet to gateway 121.

Operation 200 on gateway 120 identifies (201) the plurality of paths from the first gateway to the second gateway and assigns each of the paths a unique identifier value. The paths may be identified using border gateway protocol (BGP) or some other exchange protocol to identify different next-hop routers that correspond to the different paths. For each of the paths, a unique identifier value may be allocated sequentially in some examples, wherein a first path may be allocated a unique identifier of one while a second path may be allocated a unique identifier of two. In alternate embodiments, the path identifier may be allocated randomly or in some other manner.

Once assigned, operation 200 further receives (202) a plurality of packets from one or more computers directed to the second gateway. For example, computing nodes 130 may generate packets that are received by gateway 120 and are required to be communicated to gateway 121 for ultimate communication to computing nodes 131. For each packet of the plurality of packets, operation 200 selects (203) a path from the available paths to communicate the packet, increments a sequence number associated with the path, and encapsulates the packet with a security header that includes the unique identifier value associated with the path and the incremented sequence number associated with the path. Once encapsulated, operation 200 communicates (204) the encapsulated packet to the second gateway. In some implementations, in selecting the path from the available paths, gateway 120 may select the path using equal-cost multi-path (ECMP) routing. The path may alternatively be selected using round-robin, selected pseudo-randomly, or selected based on network path characteristics or status information associated with the network paths, or may be selected in some other manner. The network path status information may comprise bandwidth, latency, throughput, or some other network status information. The network path status information may be calculated or determined locally by the sending gateway, e.g., by pinging intermediate routers, by exchanging probe packets with the destination gateway 121, or by other known probing means. Alternatively, the network path status may be provided at least partially by other routers or network monitoring systems in the computing environment. In some examples, the path may be selected based on flow or tuple information, including source and destination IP addressing, source and destination port, protocol, or some other information in a packet from a computing node. The tuple information may be hashed to generate a hash value which may itself, or a modulo thereof, correspond to a selected path identifier.

Once a path identifier for a particular packet is selected, the path identifier may be associated with a flow identifier in a data structure, wherein the flow identifier may be a hash of a five-tuple (or other tuple) of the packet header. Once a path is identified with the flow identifier, future packets with the same flow identifier may use the same path by associating the path identifier with the packets for the flow by referencing the data structure.

As an illustrative example, a computing node of computing nodes 130 may generate a packet that is received by gateway 120. In response to receiving the packet, gateway 120 may select a path from paths 140-142 to communicate a packet encapsulated with a security protocol header such as an IPsec header. The selection may be based on network status information, such as latency, availability, and the like, may be selected pseudo-randomly, or may be selected by round-robin or by some other mechanism. Once the path is selected, gateway 120 may encapsulate the packet with the security header that includes the unique path identifier associated with the identified path and the incremented sequence number for the identified path. As a result, if gateway 120 selects path 140, the unique identifier for path 140 may be included in the header with an incremented sequence number for path 140. In the case of IPsec, the IPsec header includes a 32-bit sequence number. A portion of the sequence number, i.e., some number of 32 bits may be allocated for the unique path identifier, while a second portion of the bits may be used to provide the sequence number associated with the path. Once the packet is encapsulated with the IPsec header, the encapsulated packet may be forwarded over path 140 to gateway 121. Gateway 121 may the process the packet in accordance with the operations described below with respect to FIG. 3.

It should be noted that each path identifier therefore has a corresponding sequence number that is incremented independently from the sequence numbers for the other paths. The sequence number of a particular path is incremented only when a packet having the corresponding path identifier is transmitted, and sequence numbers of other paths are not affected that that transmission. Although demonstrated in the previous examples as incrementing the sequence number, gateway 120 may decrease or reduce the sequence number associated with a particular path.

FIG. 3 illustrates a flowchart of operation 300 illustrating an exemplary method for a gateway to receive a packet having a security protocol header via a multipath connection according to an implementation. The steps of the flowchart are referenced parenthetically in the paragraphs that follow with reference to systems and elements of computing environment 100 show in FIG. 1. Although demonstrated using gateway 121, gateway 120 may perform similar operations when a packet is received from another gateway.

As depicted, operation 300 includes receiving (301) a packet having a security protocol header from a second gateway. In response to receiving the packet, operation 300 identifies (302) a unique path identifier and a sequence number associated with the unique path identifier by parsing the security header of the received packet. Once the sequence number and the unique path identifier are identified, the receiving gateway determines (303) whether the sequence number is inside a replay window uniquely associated with the path identifier or within a window update buffer for the path identifier. The replay window corresponds to a highest sequence number received with the unique path identifier minus a window size specified for the secure connection. For example, the highest sequence number received for path 140 may correspond to 500 and the window size may be 100. Thus, any packet received between 400-500 may be "inside" the replay window, while any packet with a sequence number of 400 or less may be less than (i.e., "outside") the replay window. Additionally, the window update buffer may indicate sequence numbers higher than the current highest received sequence number permitted to be received. The window update buffer may be infinite or may be any range of values higher than the current highest received sequence number.

When the sequence number in the security protocol header of the received packet is less than, i.e., outside of, the replay window and the window update buffer, operation 300 drops (304) the packet without performing additional operations on the packet. However, when the sequence number in the received packet is "inside" the replay window or the update window buffer, operation 300 initiates ingress processing operations for the packet. Although not shown here, additional checks may be performed before accepting a packet for ingress, such as checking whether the packet was previously received. Ingress processing operations may include decrypting the packet using encryption parameters maintained by gateway 121, authenticating the packet based on hashing or other information in the security header of the packet, or performing some other operations on the packet.

In some implementations, gateway 121 may determine when the sequence number in the received packet is higher than a current highest sequence number associated with the replay window for the unique path identifier. When the sequence number is higher from the received packet, gateway 121 may update the window for the path based on the new highest sequence number. The updated window may then be used in determining how to process newly received packets over the path. In some implementations, gateway 121 may use a window update buffer to determine whether a sequence number associated with a unique path is too high to be accepted. The window update buffer may permit any sequence number that is higher than the current highest received sequence number to be accepted or may drop packets if the sequence number is higher than the window update buffer. For example, a current highest sequence number may be 500 with a window update buffer of 20. If a packet is received with a sequence number of 550, the packet may be dropped as it is "outside" the window update buffer and the replay window. In other examples, the window update buffer may be infinite, permitting any packet that is not below the replay window to be accepted for processing.

It should be noted that an ascending sequence number is only one example. It is of course possible for the sequence number to be descending, in which case a sequence number of 500 and a window size of 100 would suggest a window from 500 to 599, and a number greater than 599 would be "outside" the window. If a new packet arrives with a new lower sequence number such as 499 (because the sequence number is decremented) then the window is shifted down to start with the new sequence number and the window would extend from 499 to 598. A window update buffer may also be used to define sequence numbers that can update the replay window.

Although demonstrated in the example of computing environment 100 using two gateways, each gateway 120-121 may be coupled to any number of other gateways. For each gateway that is connected, one or more separate data structures may be maintained to reflect the unique identifiers and sequence numbers associated with egress packets and unique identifiers and sequence numbers associated with ingress packets. As an example, gateway 120 may maintain at least one data structure that indicates the unique identifiers associated with each of paths 140-142 and the sequence numbers for egress packets directed toward gateway 121. Additionally, gateway 120 may maintain at least one data structure that indicates the unique identifiers associated with each of paths 140-142 and sequence numbers for ingress packets received from gateway 121. The ingress unique path identifier and the egress unique path identifier may be different as they are assigned by the originating gateway.

In some implementations, gateways 120-121 may exchange communications to indicate to other gateways that they include multi-path sequence number functionality. If another gateway does not include multi-path sequence number functionality, then the unique path identifiers may not be used in the security protocol headers. However, if the other gateway does include multi-path sequence number functionality, then unique path identifiers may be used to facilitate multi-path VPN connections. The communications may comprise vendor identifier exchanges that are defined by internet standards. As an example, gateway 120 may indicate to gateway 121 that gateway 120 includes multi-path sequence number functionality and gateway 121 may return an indication that gateway 121 also includes multi-path sequence number functionality. When the indication is received, VPN communications may use unique path identifiers and sequence numbers to identify the sequence number associated with an individual path.

In some implementations, the sequence number may reach a size that can no longer be accommodated in the available bits of the sequence field of the security protocol header of the packet. As an example, when gateway 120 communicates an IPsec packet with gateway 121 via path 140, a user-defined configuration or hard-coded parameter may allocate the some of the 32 bits of the sequence number field of the IPsec header of the IPsec packet to the path identifier and the remaining bits to the sequence number. For example, a user may configure the gateway to allocate 24 bits for the sequence number and 8 bits for the unique path identifier. When the 24 bits are exhausted and a new sequence number is received that restarts the sequence (i.e., a sequence number of zero or one), the receiving gateway 121 may generate a rollover value that indicates the sequence number has been rolled over and may indicate the number of times that the sequence number has been rolled over. Additionally, with the rollover, the replay window size may be adjusted to account for packets with a large sequence number at the end of the 24 available bits and packets with the low sequence number. In some implementations, the rollover may be classified as an Extended Sequence Number, wherein the Extended Sequence Number is used to extend or rollover the sequence number associated with a unique path identifier. The rollover may be indicated using a flag in the header from the sending gateway, may be included in a verification portion of the header of the packet, or some other indication to differentiate a rollover packet from packets without the rollover. The receiving gateway may then maintain the number of rollovers, which can be used in verifying packets received from the sending gateway or differentiating between packets without the rollover indication.

FIG. 4 illustrates a data structure 400 to manage window size associated with different paths according to an implementation. Data structure 400 includes columns for path IDs 410, minimum sequence values 412, and maximum sequence values 414. Minimum sequence values 412 and maximum sequence values 414 are used to demonstrate a replay window 420 for each path of paths 411-414. Although demonstrated with three columns, a data structure may take many different forms. The data structure is used to at least indicate the unique identifier associated with the path, the maximum sequence number received with the path (with any required rollover values), or some other information in association with the window size.

As described herein, secure VPN communications between gateways may use multiple paths that each include one or more routers, switches, and other networking devices to communicate packets between the gateways. To support the communications, each of the gateways may maintain information about unique path identifiers and sequence numbers associated with each of the unique path identifiers. In some implementations, as packets are received at a first gateway from a second gateway, the first gateway may maintain a data structure that indicates unique path identifiers identified from the second gateway and a highest sequence number associated with each of the unique path identifiers. From the highest sequence number, a window size may be applied to determine the replay window associated with the path. The replay window may correspond to the highest sequence number packet received minus the window size in some examples. Thus, referring to path 411, the maximum sequence value 414 received is 200 and with a window size of 100, the minimum sequence value must be 101 or higher.

When a packet is received with a unique path identifier, the sequence number in the packet is compared to the replay window for the unique path identifier, which is independent from window sizes associated with other path identifiers. If the sequence number is less than the replay window for the unique path identifier, the packet is dropped. Otherwise, the gateway implements ingress processing operations on the packet that can include decrypting or decapsulating the packet, authenticating the packet based on information in the header of the encapsulated packet, or providing some other operation in association with the packet. In some examples, when the sequence number in a received packet is higher than the highest sequence number associated with a path, the gateway may modify the replay window using the new highest sequence number. Thus, if a packet were received for path 411 with a sequence number of 201, the replay window may be modified to increase the minimum permitted sequence number. In some implementations, a window update buffer may be used to determine when a replay window should be updated. The window update buffer may be infinite or may comprise a defined number. For example, a window update buffer for path 411 may permit packets to be processed when the value for the sequence number of the packet is within 20 of the current highest maximum sequence number. Thus, a packet that is received with a sequence number of 210 may be processed and used to update the window, while a packet that is 230 may not be processed and can be dropped in some examples.

In some implementations, the sequence number may require a rollover when bits are no longer available to increase the sequence number in a packet. For example, an IPsec packet includes 32 bits to indicate the sequence number associated with the packet. Here, a first portion of the bits may be used to indicate the unique path identifier for the path between the gateways, while a second portion of the bits may be used to indicate the sequence number associated with the unique path. When the bits available to the sequence number have been reached, a rollover flag may be set, or a rollover value may be incremented that indicates the number of times that a rollover has occurred in association with the unique path. For example, if 24 bits are available for a sequence number associated with a path, when the 24 bits are exhausted and a packet is received that restarts the sequence number, a flag may be set in association with the unique path indicating a rollover at the receiving gateway. This flag or value may be updated as many times as required and may further be used to update the replay window to include the highest sequence numbers and the rolled over lowest sequence numbers. In one embodiment, a flag is set at a first rollover event or for a first packet associated with a rollover and cleared at a subsequent event or packet.

Although demonstrated as maintaining a data structure for received packets from a second gateway, one or more data structures may also be employed to store information associated with egress packets from the first gateway to the second gateway. In some examples, the first gateway may identify the paths from the first gateway to the second gateway using border gateway protocol or some other mechanism. In some implementations, the first gateway may exchange routing protocols to identify next-hops and routing paths between the first gateway and the second gateway. As the various paths are identified, a unique identifier may be allocated to each of the paths, wherein each path may be sequentially allocated a unique identifier in some examples. When a packet having a security protocol header is communicated from the first gateway to the second gateway, the first gateway may select a path identifier and increment the sequence number to be included in the security protocol header. The first gateway may maintain at least one data structure that associates the unique path identifier with the current sequence number for the path. Additionally, the gateway may maintain associations between the unique path identifiers and the sequence numbers for each of the coupled gateways. Thus, unique path identifiers may be identified for the various paths associated with each of the other gateways.

Figure 5:
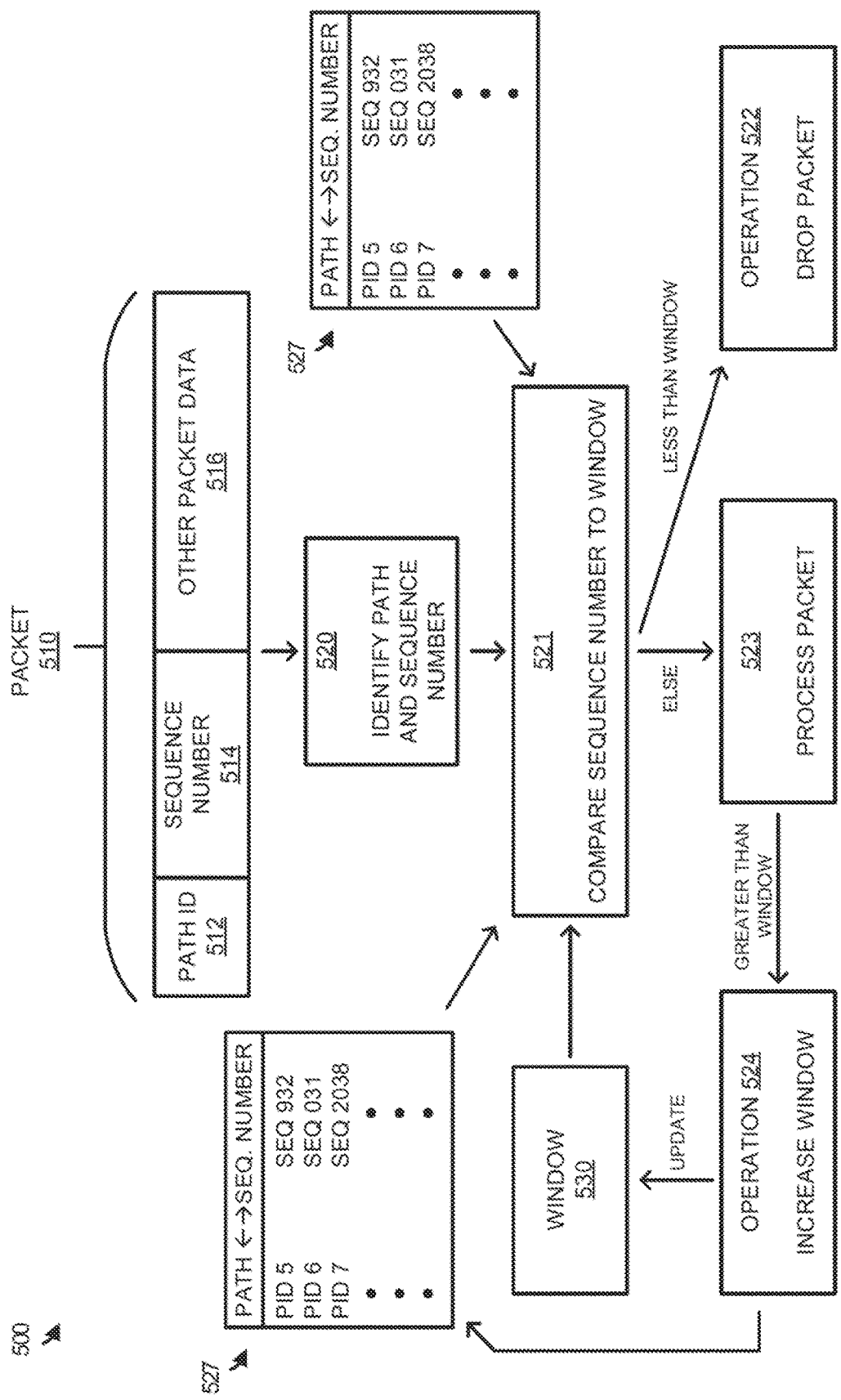
FIG. 5 illustrates an operational scenario of receiving a packet in a multipath connection according to an implementation.

FIG. 5 illustrates an operational scenario 500 of receiving a packet in a multipath connection according to an implementation. Operational scenario 500 includes received packet 510, operations 520-524, and window 530. Received packet 510 further includes path identifier ("ID") 512, sequence number 514, and other packet data 516.

Gateway receives 121 receives packet 510 is from gateway 120, wherein packet 510 comprises an includes a security header, such as an IPsec header for providing encrypted and secure communications between two computing systems or networks. When the packet is received, operation 520 is performed, in which a unique path identifier and a sequence number is read from the packet's security header. In some implementations, the security protocol is IPsec, and a first portion, e.g., a first eight bits, of the IPsec sequence number field contains unique path identifier 512 and a second portion, e.g., the remaining 24 bits, contains sequence number 514. The unique path identifier is written into the security header by the sending gateway. For each of the unique path identifiers, a sending gateway may maintain a sequence number that indicates that sequence of packets from the sending gateway to the receiving gateway.

After the unique path and sequence number are identified in packet 510, operation 521 is performed to compare the sequence number from the packet to a replay window 530 associated with the path. The replay window is maintained, e.g., by path-sequence number table 527, by the gateway based on the highest sequence number received on the path and may be defined by an administrator of the network in some examples. For example, a replay window may permit the receipt of packets with a sequence number that is up to 64 less than the highest sequence number received. Here, when the sequence number 514 is less than the replay window for the path, operation 522 is performed wherein the packet is dropped, i.e., deleted, overwritten, or not further processed. In contrast, if the sequence number 514 is not less than the window, operation 523 is performed that is used to process the packet in accordance with the VPN protocol. The processing of the packet may include decrypting the packet, performing authentication on the packet using information in the security protocol header, or performing some other security operation prior to forwarding the packet toward a destination computer. The destination computer may comprise a virtual computer, such as a virtual machine, container, or the like, or a physical computer, such as a desktop computer, server, or some other physical computer.

In addition to processing the packets that are not less than the window, the receiving gateway may also determine whether the received sequence number is larger than a current highest sequence number associated with the window. If the sequence number from packet 510 is larger than the highest sequence number for the current replay window 530, operation 524 may be used to increase the window based on the newly identified highest sequence number and table 527 may be updated. In some implementations, the sequence number received in the packet may be higher than the current highest sequence number associated with the replay window but exceed a threshold for increasing the window (window update buffer). For example, the current highest sequence number may be 100 and a packet may be received that has a sequence number of 115. If the window update buffer is ten, the packet may be dropped or may not be used to update the replay window in some examples. In other examples, the window update buffer may not have a limit permitting the highest received sequence number received to update replay window.

In some implementations, the sequence number may exhaust the number of bits available in the security protocol header. To accommodate the condition, the receiving gateway may monitor for a rollover of the sequence number and set a flag to indicate that the sequence number has been rolled over and/or the number of times that the sequence number has been rolled over. Additionally, the replay window may be updated to include both the sequence numbers with the higher values and the sequence numbers with the lower values to accommodate the rollover. In some implementations, the rollover may be used as part of the verification of the packet, wherein a verification portion of the packet may be used to indicate the rollovers of the sequence number to differentiate rollover packets from non-rollover packets.

Figure 6:
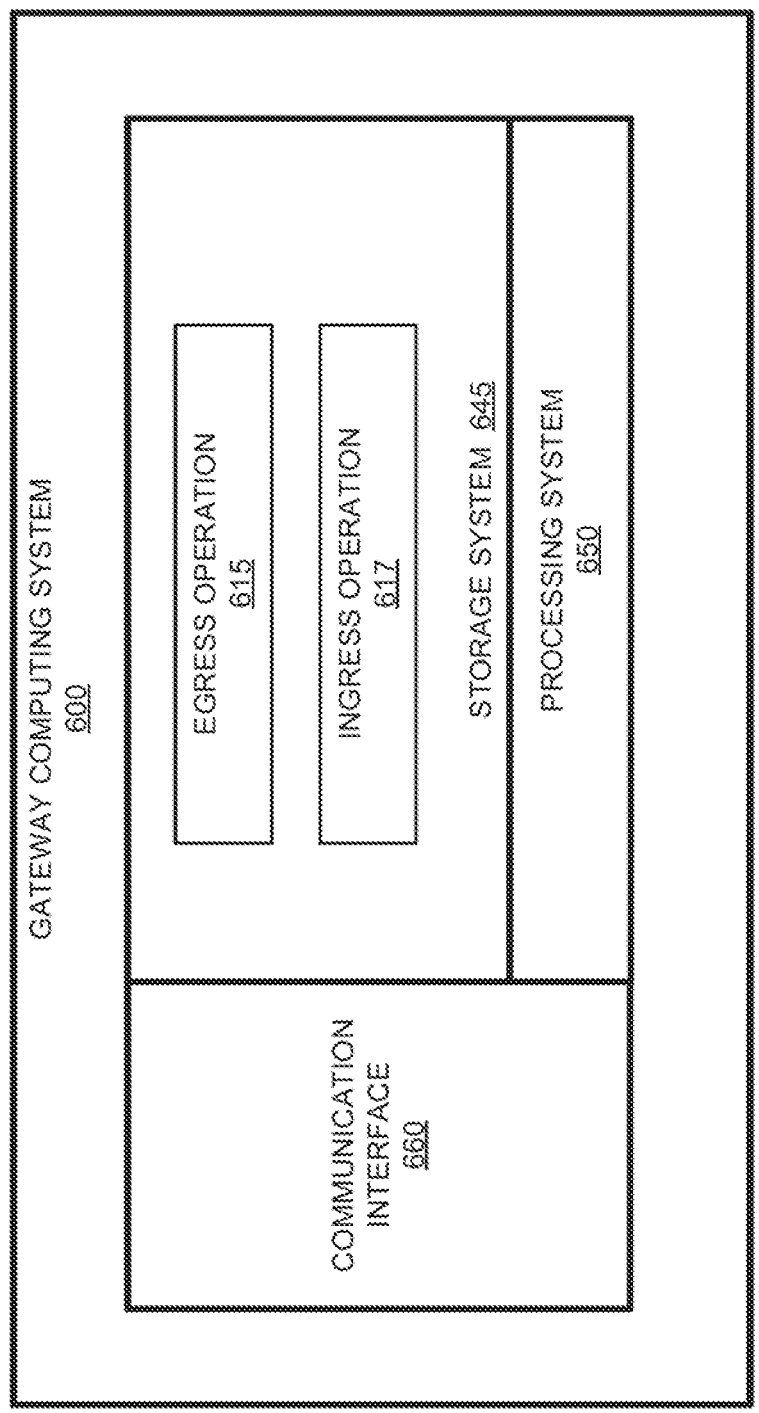
FIG. 6 illustrates a gateway computing system to manage replay windows associated with multipath connections according to an implementation.

FIG. 6 illustrates a gateway computing system 600 to manage replay windows associated with multipath connections according to an implementation. Computing system 600 is representative of any computing system or systems with which the various operational architectures, processes, scenarios, and sequences disclosed herein for a gateway can be implemented. Computing system 600 is an example of gateways 120-121 of FIG. 1, although other examples may exist. Computing system 600 includes storage system 645, processing system 650, and communication interface 660. Processing system 650 is operatively linked to communication interface 660 and storage system 645. Computing system 600 may further include other components such as a battery and enclosure that are not shown for clarity.

Communication interface 660 comprises components that communicate over communication links, such as network cards, ports, radio frequency (RF), processing circuitry and software, or some other communication devices. Communication interface 660 may be configured to communicate over metallic, wireless, or optical links. Communication interface 660 may be configured to use Time Division Multiplex (TDM), Internet Protocol (IP), Ethernet, optical networking, wireless protocols, communication signaling, or some other communication format—including combinations thereof. Communication interface 660 may be configured to communicate with other gateways using VPN and may further communicate with one or more computers, such as host computing systems, desktop computing systems, or some other computing system.

Processing system 650 comprises microprocessor and other circuitry that retrieves and executes operating software from storage system 645. Storage system 645 may include volatile and nonvolatile, removable and non-removable media implemented in any method or technology for storage of information, such as computer readable instructions, data structures, program modules, or other data. Storage system 645 may be implemented as a single storage device but may also be implemented across multiple storage devices or sub-systems. Storage system 645 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. In no case is the storage media a propagated signal.

Processing system 650 is typically mounted on a circuit board that may also hold the storage system. The operating software of storage systems 645 comprises computer programs, firmware, or some other form of machine-readable program instructions. The operating software of storage system 645 comprises egress operation 615 and ingress operation 617. The operating software on storage system 645 may further include utilities, drivers, network interfaces, applications, or some other type of software. When read and executed by processing system 650 the operating software on storage system 645 directs computing system 600 to operate as described herein. In some implementations, compression process 615 may provide operations 200 and 300 described in FIGS. 2 and 3.

In at least one implementation, egress operation 615 directs processing system 650 to receive a packet from a computer that is to be communicated to a second gateway over the internet. In response to receiving the packet, egress operation 615 directs processing system 650 to select a path to the second gateway from a plurality of paths, wherein each of the paths may include one or more routers or other network elements. Once selected, computing system 600 increments a sequence number associated with the path and encapsulates the packet with security protocol header that indicates a unique identifier value associated with the selected path and the incremented sequence number for the path. After encapsulation, egress operation 615 directs processing system 650 to communicate the encapsulated packet to the second gateway.

In some implementations, gateway computing system 600 may maintain one or more data structures that can associated unique path identifiers to the second gateway with sequence numbers for the corresponding path. Gateway computing system 600 may further maintain information for one or more additional gateways, including path identifiers for the paths to each of the additional gateways and sequence numbers associated with each of the paths.

In addition to providing egress operation 615 for egress VPN packets, ingress operation 617 directs processing system 650 to receive a VPN packet from a second gateway. In response to receiving the packet, ingress operation 617 directs processing system 650 to identify a unique path identifier and a sequence number associated with the unique path identifier in the security protocol header. Once identified, ingress operation 617 determines whether the sequence number is less than a replay window associated with the unique path identifier. In some implementations, ingress operation 617 may maintain replay windows associated with the various paths from the second gateway. The replay windows are based on the highest sequence number received for the unique identifier minus a specified window size (e.g., 100 sequence numbers less than the highest received). If the sequence number in the received packet is less than the replay window, ingress operation 617 drops the packet. However, if the sequence number in the received packet is not less than the replay window or inside the replay window, ingress operation 617 may process the packet for ingress, wherein the processing may include decrypting the packet, authenticating the packet using information in the header, forwarding the decapsulated packet toward a destination computer, or providing some other operation.

In at least one implementation, ingress operation 617 may determine whether the sequence number value in the packet is inside the replay window or is larger than the replay window (i.e., higher than the maximum sequence number previously received for the unique path identifier). If the sequence number is higher than the current replay window, ingress operation 617 may determine whether the value for the sequence number is within a window update buffer and may update the replay window when the value is in the window update buffer. In some examples the window update buffer may permit any value that is larger than the current maximum sequence number received. However, the buffer may a range of values in some examples.

In some implementations, the sequence number and unique path identifier may be placed in the sequence number bits portion of an IPsec header, wherein a first portion of the bits may be allocated to providing the unique identifier and a second portion may be allocated to providing the sequence number associated with the unique identifier. The unique identifiers for the various paths between gateways may be allocated by the sending gateway, wherein the sending gateway may identify the various paths to a destination gateway and allocate a unique identifier to each of the paths. In some examples, gateway computing system 600 may notify the second gateway that computing system 600 includes multi-path sequence number functionality. If both gateways include the functionality, then the gateways may use the operations described herein. In some examples, when the gateways have determined they both include multi-path sequence number functionality, a gateway may use discovery mechanisms or gateway exchanges to identify next-hop information and identify the various available paths to the destination gateway. For each of the identified paths, the gateway may identify a unique identifier and assign the unique identifier to the path. Once a communication is required, a path can be selected randomly, based on network status information, or based on some other mechanism, and the unique identifier for the path and the sequence number for the path may be used to communicate the packet.

The included descriptions and figures depict specific implementations to teach those skilled in the art how to make and use the best mode. For teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

What is claimed is:

1. A method of operating a first gateway comprising:
   receiving a first packet having a first security protocol header from a second gateway;
   identifying, from the first security protocol header, a first path identifier and a first sequence number;
   based at least in part on the whether a value of the first sequence number is within a first replay window and a window update buffer associated with the first path identifier, determining whether to drop the first packet or to subject the first packet to ingress processing;
   receiving a second packet having a second security protocol header from the second gateway;
   identifying, from the second security protocol header, a second path identifier and a second sequence number, wherein the second path identifier is different from the first path identifier;
   based at least in part on whether a value of the second sequence number is within a second replay window and a window update buffer associated with the second path identifier, determining whether to drop the second packet or to subject the second packet to ingress processing; and
   wherein the second replay window associated with the second path identifier is independent of the first replay window associated with the first path identifier.

2. The method of claim 1, wherein the ingress processing for the first packet comprises decrypting the first packet and authenticating the first packet.

3. The method of claim 1, wherein the first sequence number is ascending, and wherein the method further comprises:
   determining that the first sequence number is larger than a highest sequence number associated with the first replay window and in the window update buffer associated with the first path identifier; and
   in response to determining that the first sequence number is larger than a highest sequence number associated with the first replay window and in the window update buffer associated with the first path identifier, updating the first replay window based on the first sequence number and not updating the second replay window.

4. The method of claim 1, wherein the first security protocol header comprises a first IPsec header and wherein the second security protocol header comprises a second IPsec header.

5. The method of claim 1 further comprising:
   identifying a plurality of paths from the first gateway to a third gateway;
   assigning each path of the plurality of paths a unique identifier value;
   receiving a plurality of packets from one or more computers directed to the third gateway;
   for each packet of the plurality of packets:
     selecting a path of the plurality of paths to communicate the packet;
     incrementing a sequence number associated with the path;
     encapsulating the packet with an IPsec header that indicates the unique identifier value associated with the path and the incremented sequence number for the path; and
     communicating the encapsulated packet to the third gateway.

6. The method of claim 5, wherein selecting the path of the plurality of paths comprises selecting a path using pseudo-random selection or selecting a path based on network status information.

7. The method of claim 1 further comprising exchanging one or more communications with the second gateway to determine that the second gateway includes multi-path sequence number functionality.

8. The method of claim 1 further comprising determining the replay window based on a highest sequence number received in association with the unique path identifier prior to the first packet.

9. A computing apparatus comprising:
   a storage system;
   a processing system operatively coupled to the storage system; and
   program instructions stored on the storage system that, when executed by the processing system, direct the computing apparatus:
     receive a first packet having a first security protocol header from a second gateway;
     identify, from the first security protocol header, a first path identifier and a first sequence number;
     based at least in part on the whether a value of the first sequence number is within a first replay window and a window update buffer associated with the first path identifier, determine whether to drop the first packet or to subject the first packet to ingress processing;
     receive a second packet having a second security protocol header from the second gateway;
     identify, from the second security protocol header, a second path identifier and a second sequence number, wherein the second path identifier is different from the first path identifier;
     based at least in part on whether a value of the second sequence number is within a second replay window and a window update buffer associated with the second path identifier, determine whether to drop the second packet or to subject the second packet to ingress processing; and
     wherein the second replay window associated with the second path identifier is independent of the first replay window associated with the first path identifier.

10. The computing apparatus of claim 9, wherein the ingress processing for the first packet comprises decrypting the first packet and authenticating the first packet.

11. The computing apparatus of claim 9, wherein the sequence number is ascending, and wherein the program instructions further direct the computing apparatus to:
    determine that the first sequence number is larger than a highest sequence number associated with the first replay window and in the window update buffer; and
    in response to determining that the first sequence number is larger than a highest sequence number associated with the first replay window and in the window update buffer, updating the first replay window based on the first sequence number and not updating the second replay window.

12. The computing apparatus of claim 9, wherein the first security protocol header comprises a first IPsec header and wherein the second security protocol header comprises a second IPsec header.

13. The computing apparatus of claim 9, wherein the program instructions further direct the computing apparatus to:

identify a plurality of paths from the first gateway to a third gateway;

assign each path of the plurality of paths a unique identifier value;

receive a plurality of packets from one or more computers directed to the third gateway;

for each packet of the plurality of packets:
- select a path of the plurality of paths to communicate the packet;
- increment a sequence number associated with the path;
- encapsulate the packet with an IPsec header that indicates the unique identifier value associated with the path and the incremented sequence number for the path; and
- communicate the encapsulated packet to the third gateway.

14. The computing apparatus of claim 13, wherein selecting the path of the plurality of paths comprises selecting a path using pseudo-random selection or selecting a path based on network status information.

15. The computing apparatus of claim 9, wherein the program instructions further direct the computing apparatus to exchange one or more communications with the second gateway to determine that the second gateway includes multi-path sequence number functionality.

16. The computing apparatus of claim 9, wherein determining whether the sequence number is less than a replay window associated with the unique path identifier determining whether the sequence number is less than a replay window associated with the unique path identifier based at least on a rollover value associated with the unique path identifier.

17. A system comprising:
a first gateway; and
a second gateway configured to:
- receive a first packet having a first security protocol header from the first gateway;
- identify, from the first security protocol header, a first path identifier and a first sequence number;
- based at least in part on the whether a value of the first sequence number is within a first replay window and a window update buffer associated with the first path identifier, determine whether to drop the first packet or to subject the first packet to ingress processing;
- receive a second packet having a second security protocol header from the first gateway;
- identify, from the second security protocol header, a second path identifier and a second sequence number, wherein the second path identifier is different from the first path identifier;
- based at least in part on whether a value of the second sequence number is within a second replay window and a window update buffer associated with the second path identifier, determine whether to drop the second packet or to subject the second packet to ingress processing; and
- wherein the second replay window associated with the second path identifier is independent of the first replay window associated with the first path identifier.

18. The system of claim 17, wherein the ingress processing for the first packet comprises decrypting the first packet and authenticating the first packet.

19. The system of claim 17, wherein the first security protocol header comprises a first IPsec header and wherein the second security protocol header comprises a second IPsec header.

20. The system of claim 17, wherein the first gateway is further configured to:
communicate the first packet and the second packet to the second gateway.

* * * * *